July 10, 1951 E. L. JOHNSON 2,559,770
PHOTOGRAPHIC COPYING APPARATUS
Filed June 26, 1950 4 Sheets-Sheet 1

Fig.1.

Inventor:
Elmer L. Johnson
By Robert E. Miehle, Atty.

July 10, 1951  E. L. JOHNSON  2,559,770
PHOTOGRAPHIC COPYING APPARATUS
Filed June 26, 1950  4 Sheets-Sheet 4

Inventor:
Elmer L. Johnson
By Robert E. Mechlin, Atty.

Patented July 10, 1951

2,559,770

UNITED STATES PATENT OFFICE 2,559,770

PHOTOGRAPHIC COPYING APPARATUS

Elmer L. Johnson, Chicago, Ill., assignor to Bell & Howell Company, Chicago, Ill., a corporation of Illinois Application June 26, 1950, Serial No. 170,373

16 Claims. (Cl. 88—24)

1

The present invention relates particularly to the control of microfilm recording apparatus in which sheets or records are fed in succession and in a continuous manner through the photographic field of a camera, and a sensitized strip or film in the camera is fed under the control of the fed sheets or records in a continuous manner through the exposure field of the camera in synchronism with the fed sheets or records during the photographing operation.

Objects of the invention reside in the provision of novel, convenient and effective means for winding the usual leader portion of a sensitized strip or film in the camera from the camera feed reel onto the camera take up reel preparatory to exposure of the strip and winding the usual trailer portion of the strip from the feed reel onto the take up reel after exposure of the strip preparatory to the removal of the strip from the camera for the development thereof, which permits of effecting and preferably does effect winding of the leader and trailer portions of the strip at a desirable higher speed than that at which the strip is fed during normal operation of the apparatus for photographing, which automatically terminates operation of the strip feeding means to wind the leader and trailer portions of the strip onto the take up reel after a predetermined interval and preferably automatically restores the apparatus to normal condition for photographing at the end of such interval with a view toward convenience and requiring a minimum amount of attention, and which permits of effecting and preferably does effect the winding of the leader and trailer portions of the strip without necessitating operation of the sheet or record feeding means of the apparatus.

The invention will be better understood by reference to the accompanying drawing forming a part hereof and in which—

2

Figures 6, 7, 8:
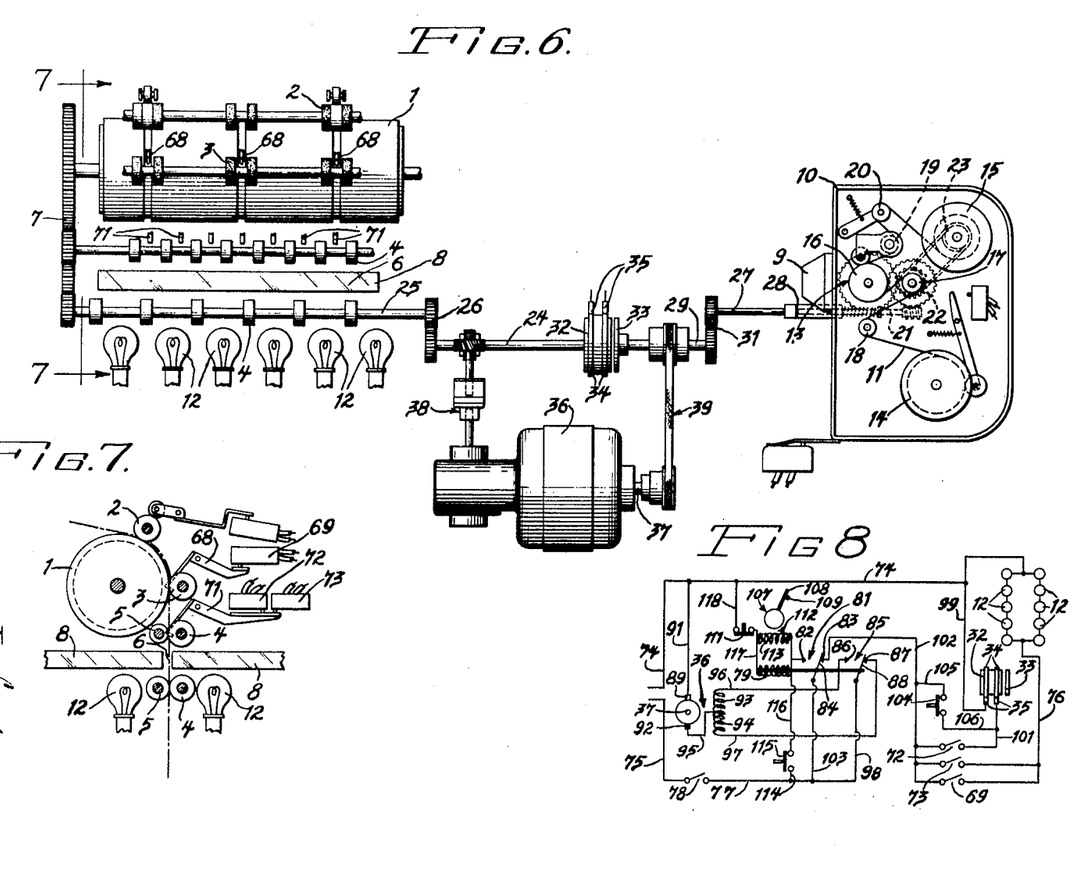
Figure 6 is a partially schematic view in side elevation showing various elements of a photographic copying apparatus in the form of a microrecorder embodying my invention.
Figure 7 is a sectional view taken substantially on the line 7—7 of Figure 6.
Figure 8 is a wiring diagram of the apparatus.

Referring to the drawing and instantly to Figures 6 and 7 thereof, a horizontal rotatable feed drum 1 receives sequentially fed sheets or records, and rotatable pressure rollers 2 and 3 are yieldably urged into pressure engagement with the feed drum, and the sheets or records, as they are fed to the feed drum, are engaged between the feed drum and pressure rollers and are fed downwardly by the feed drum as it is rotated.

A pair of vertically spaced horizontal rotatable feed rollers 4 are arranged below the feed drum 1 in parallelism therewith and rotatable pressure rollers 5 are yieldably urged into pressure engagement respectively with the feed rollers 4. Sheets fed edgewise downwardly from the feed drum 1 engage between the pairs of rollers 4 and 5 and are vertically and downwardly fed edgewise through a photographic field 6 between the pairs of rollers 4 and 5, this photographic field being that of the camera of the apparatus, hereinafter described. The sheet path is indicated by the dot and dash line in Figure 2. The feed drum 1 and the feed rollers 4 are driven in timed relation by gearing generally designated at 7 in Figure 6.

A pair of opposed converging reflectors 8 are arranged in a horizontal plane and transversely of the vertical sheet path and obliquely to and on opposite sides of the photographic field 6 for reflecting images of opposite faces of the fed sheets as they pass the photographic field to the objective 9 of a photographic camera 10 for the photographing of opposite faces of the fed sheets on a sensitized strip or film 11 in the camera. Two horizontal banks of incandescent electric lamps 12 are arranged respectively on opposite sides of the vertical sheet path in parallelism therewith and immediately below the photographic field 6 and reflectors 8 for illuminating opposite faces of the fed sheets at the photographic field for the photographing of said opposite faces.

The camera 10 is of the flow type and is provided therein with strip feeding means for feeding the sensitized strip 11 in the camera through the exposure field 13 of the camera at the rear of the camera objective 9, and, see Figure 6, the strip feeding means comprises as follows:

Vertically spaced feed and take up reels 14 and 15 are rotatably mounted in the camera in the usual manner providing for installation of the reels in and removal thereof from the camera. A rotatably mounted exposure drum 16 of relatively large diameter is disposed to the rear of the objective 9 and supports the sensitized strip 11 at the exposure field 13 of the camera. A rotatably mounted idler roller 17 is disposed at the rear of the exposure drum 16, a rotatably mounted idler roller 18 is disposed below the exposure drum, and two vertically spaced rotatably mounted idler rollers 19 and 20 are disposed above the exposure drum.

The sensitized strip 11 extends from a roll of the strip on the lower or feed reel 14 about the roller 18, then in an opposite manner about the roller 17, then in an opposite manner about the exposure drum 16, then in an opposite manner about the roller 19, then in an opposite manner about the roller 20, and finally to a roll of the sensitized strip on the upper or take up reel 15 on which the strip is wound as it is exposed.

A shaft 21 is rotatably mounted on the camera 10 in parallelism with the focal axis of the camera and the exposure drum 16 is driven from this shaft through gearing generally designated at 22, and the take up reel 15 is driven from the gearing 22 by a yielding belt and pulley drive 23 to take up the sensitized strip as it is fed by rotation of the exposure drum 16.

Figure 1:
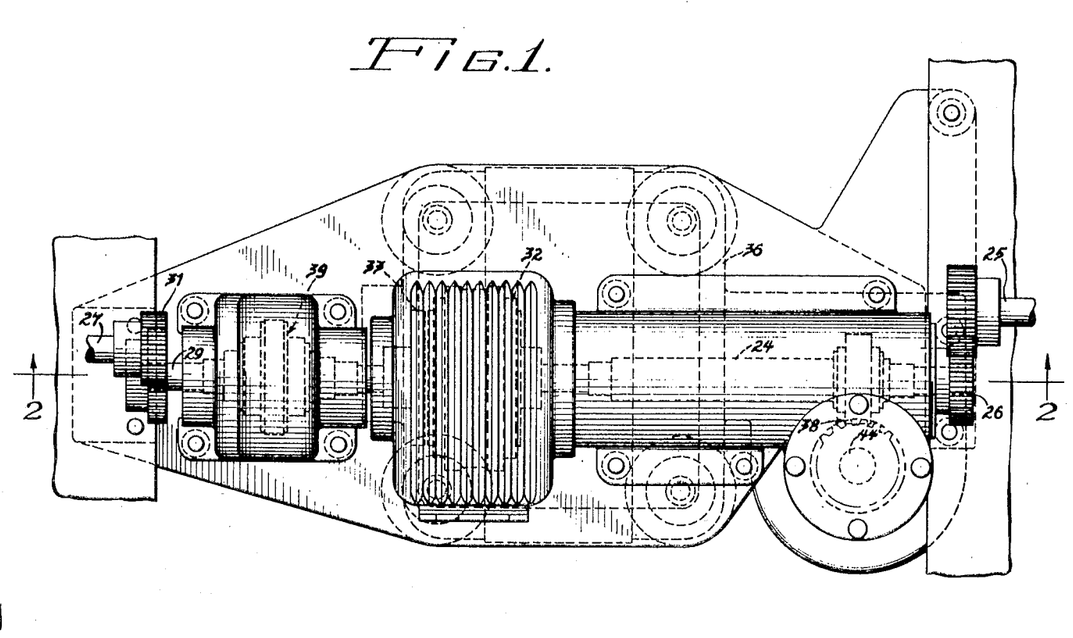
Figure 1 is a top plan view of a driving mechanism embodying my invention.
Figure 2:
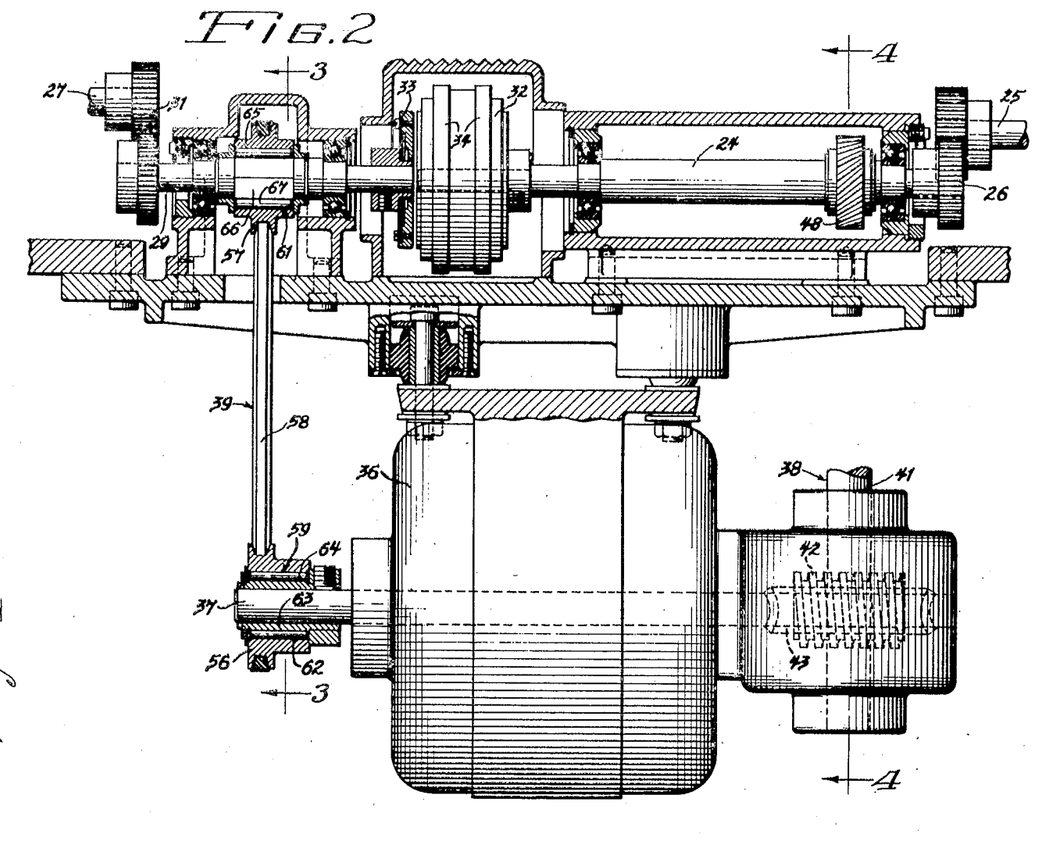
Figure 2 is a side elevational view of the same with parts broken away and shown in section and with parts omitted.

A rotatably mounted shaft 24 is disposed in parallelism with the shaft 25 of the lower sheet feed roller 4, see Figures 1, 2 and 6, and is connected with the shaft 25 by gearing 26 and so constitutes a drive shaft for driving the sheet or record feeding means comprising the feed drum 1, the feed rollers 4 and their pressure rollers. A rotatably mounted shaft 27 is alined with the camera shaft 21, and is connected with the camera shaft for driving the same by a normally engaged clutch generally designated at 28. A rotatably mounted shaft 29 is alined with the record feeding means drive shaft 24, and is connected with the shaft 27 by gearing 31 and so constitutes a drive shaft for driving the sensitized strip or film feeding means of the camera. The sensitized strip or film feeding means drive shaft 29 is selectively driven from the record feeding means drive shaft 24 by an electromagnetic clutch associated with the adjacent ends of the drive shafts 24 and 29 and comprising a solenoid clutch element 32 secured on the shaft 24 and a clutch element 33 of magnetic material rotatably secured on the shaft 29 and attracted into frictional engagement with the clutch element 32 when the latter is energized, the clutch element 32 being energized through slip rings 34 thereon and brushes 35 respectively contacting the slip rings.

A reversible electric drive motor 36, such as of the series wound two field type, is mounted below the shafts 24 and 29 with its shaft 37, which constitutes a main drive shaft, disposed in parallelism with the shafts 24 and 29, as best shown in Figure 2. A speed reducing positive transmission, generally designated at 38, is disposed at one end of the drive motor and its shaft serves to drive the record feeding means drive shaft 24 from the motor shaft, and a high speed belt and pulley transmission, generally designated at 39, is disposed at the other end of the drive motor and its shaft and serves to drive the film feeding means drive shaft 29 from the motor shaft, these transmissions functioning in alternation as hereinafter described.

Figure 4:
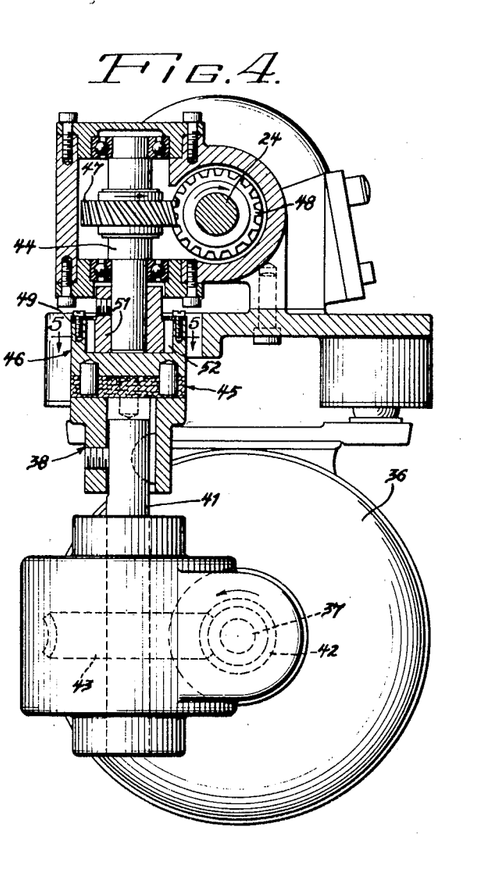
Figure 4 is a sectional view taken substantially on the line 4—4 of Figure 2.
Figure 5:
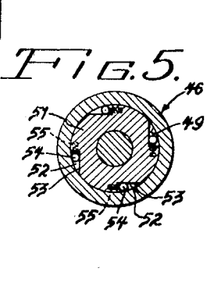
Figure 5 is a partial section taken substantially on the line 5—5 of Figure 4.

The transmission 38, see Figures 2 and 4, comprises a rotatable vertical shaft 41, a worm 42 fixed on an end of the motor shaft 37 and meshing with a worm gear 43 fixed on the shaft 41, a rotatable vertical shaft 44 above and aligned with the shaft 41 and connected with the shaft 41 by a flexible coupling 45 and an overrunning clutch 46, a spiral gear 47 fixed on the shaft 44, and a spiral gear 48 fixed on the shaft 24 and meshing with the gear 47. The overrunning clutch 46, see Figures 4 and 5, comprises a bored clutch element 49 fixed with the shaft 41 by means of the flexible coupling 45, a clutch hub 51 fixed on the shaft 44 and rotatably engaged in the bore of the clutch element 49 and provided with recesses 52 spaced about the periphery thereof and providing cam surfaces 53 extending correspondingly angularly of the clutch hub, and clutch rollers 54 in the recesses 52 and yieldably urged between the cam surfaces 53 and the internal surface of the clutch element 49 by springs 55 reacting on the clutch hub.

The overrunning clutch 46 permits the motor 36 to drive the record feeling means drive shaft 24 through the transmission 38 with rotation of the motor shaft 37 in only one direction, and permits the motor to run free of the shaft 24 when the motor shaft is rotating in the opposite direction, and the arrangement is such that the feed drum 1 and feed rollers 4 are driven in the directions in which they feed sheets or records downwardly past the photographic field 6. The transmission 38 serves to drive the apparatus for photographing sheets or records and observing that the electromagnetic clutch 32—33 is in series with the overrunning clutch 46, the clutch 32—33, when engaged, drives the film feeding means drive shaft 29 from the record feeding means drive shaft 24 and is under the control of sheets or records fed by the record feeding means as hereinafter described, to drive the film feeding means while sheets or records are passing through the photographic field 6 for the photographing of the sheets or records on the film 11 in the camera 10.

Figure 3:
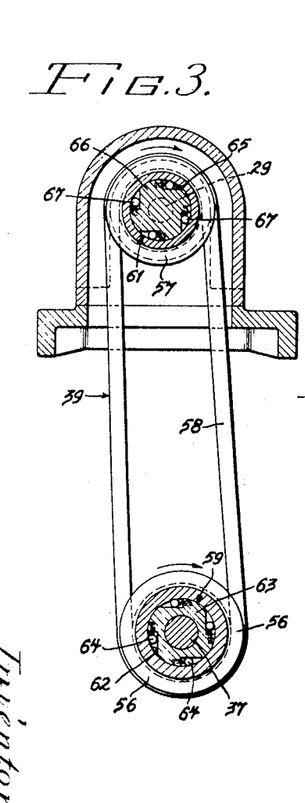
Figure 3 is a sectional view taken substantially on the line 3—3 of Figure 2.

The transmission 39, see Figures 2 and 3, comprises two bored belt pulleys 56 and 57 respectively coaxial with the motor shaft 37 and the film feeding means drive shaft 29, a belt 58 trained about these pulleys, and overrunning clutches 59 and 61 respectively between the motor shaft and the pulley 56 and between the film feeding means drive shaft and the pulley 57. The overrunning clutches 59 and 61 are similar in construction to the overrunning clutch 46 heretofore described, the clutch 59 comprising the bore 62 of the pulley 56, a recessed clutch hub 63 fixed on the motor shaft 37 and rotatably engaged in the bore 62, and clutch rollers 64, and the clutch 61 comprising the bore 65 of the pulley 57, a recessed clutch hub 66 fixed on the film feeding means drive shaft 29 and rotatably engaged in the bore 65, and clutch rollers 67.

The overrunning clutches 59 and 61 permit the motor 36 to drive the film feeding means drive shaft 29 through the transmission 39 in the same direction as it is driven by the transmission 38 and the clutch 32—33 with rotation of the motor drive shaft 37 in only the direction opposite that in which the motor drive shaft drives the record feeding means drive shaft 24 through the transmission 38, and permit the motor to run free of the shaft 29 when the motor shaft is rotating in the direction in which it drives the shaft 24 through the transmission 38, the transmission 39 being a high speed one relative to the transmission 38 by reason of the speed reduction of the worm 42 and worm gear 43 and by reason of the pulleys 56 and 57 being of approximately the same diameter, so that the motor drives the film feeding means drive shaft 29 through the transmission 39 at a higher speed than that at which it drives this shaft through the transmission 38 and clutch 32—33.

While one overrunning clutch in the transmission 39 will suffice for the functioning thereof, it is preferable that two be employed respectively connected with the motor drive shaft 37 and the film feeding means drive shaft 29, so that when the transmission 39 is not functioning, these shafts are free of the main portion of this transmission and interference thereof with the functioning of the apparatus for photographing sheets or records is minimized.

The transmission 38 serves to drive the apparatus for photographing sheets or records with rotation of the motor shaft 7 in one direction as indicated by the arrows in Figure 4, and the transmission 39 serves to drive the film feeding means to wind the leader and trailer portions of the film 11 at a comparatively high speed with rotation of the motor shaft in the opposite direction as indicated by the arrows in Figure 3, so that the drive by one or the other of the transmissions 38 and 39 is selected by reversing the motor 36 to reverse the direction of rotation of the motor shaft 37.

Referring to Figures 6, 7 and 8, the drive motor 36, the electromagnetic clutch 32—33, and the illuminating lamps 12 are energized and controlled in the following manner:

A pivotally mounted switch arm 68, see Figures 6 and 7, is yieldably urged into a normal position in which one end thereof in the form of spaced fingers projects across the path of the fed sheets or records as they are fed toward the photographic field 6, and a fed sheet engages this arm and moves and maintains it out of the sheet path while the switch arm is under the control of the sheet. A light control switch 69, under the control of the switch arm 68, is yieldably urged into open position and remains open when the switch arm is in its normal position and is closed by the switch arm when the switch arm is positioned under the control of a fed sheet.

A pivotally mounted switch arm 71 is yieldably urged into a normal position in which one end thereof in the form of spaced fingers projects across the path of the fed sheets or records as they are fed toward the photographic field 6, and a fed sheet engages this arm and moves and maintains it out of the sheet path while this switch arm is under the control of the sheet. Clutch and light control switches 72 and 73, under the control of the switch arm 71, are yieldably urged into open position and remain open when the switch arm 71 is in its normal position and are closed by this switch arm when this switch arm is positioned under the control of a fed sheet. The switch arm 71 is disposed closer to the photographic field 6 than is the switch arm 68 and the switch arms are spaced a distance lineally of the sheet path less than the corresponding dimension of the fed sheets, so that the switches 72 and 73 are under the control of a fed sheet in following overlapping relation with the control of the switch 69 by the sheet for a purpose hereinafter appearing.

Referring to Figure 8, lead wires 74 and 75 are supplied from a suitable source of electrical current, and the lead wire 74 is connected to one terminal of each bank of the illuminating lamps 12. The other terminal of each bank of illuminating lamps is connected by a branch wire 76 with one terminal of each of the lamp control switches 69 and 73. A wire 77 is connected with the lead wire 75 by a main control switch 78 and forms a continuation of this lead wire, the switch 78 being closed to place the apparatus in operation.

An electromagnetic relay comprises a relay coil 79, a single pole double throw switch 81 under the control of the relay coil and comprising two stationary contacts 82 and 83 and a switch arm 84 alternately contacting these stationary contacts, and a second single pole double throw switch 85 under the control of the relay coil and comprising two stationary contacts 86 and 87 and a switch arm 88 alternately contacting these stationary contacts. The switch arms 84 and 88 are yieldably urged to contact these switch arms respectively with the contacts 83 and 87 when the relay coil is deenergized and the switch arms are respectively contacted with the contacts 82 and 86 when the relay coil is energized.

The motor 36, as shown, is of the series wound two field type and has one of the armature brushes 89 thereof connected with the lead wire 74 by a wire 91 and has the other armature brush 92 thereof connected with opposing terminals of the two field coils 93 and 94 of the motor by a wire 95. The other terminals of the field coils are respectively connected to the stationary contacts 86 and 87 of the switch 85 by wires 96 and 97, and the switch arm 88 of this switch is connected with the wire 77 by a wire 98, so that the switch 85 constitutes a reversing switch connected with the motor for selecting the direction of rotation of the motor shaft 37.

A wire 99 connects the line wire 74 with one brush 35 of the electromagnetic clutch 32—33, and a wire 101 connects the other brush 35 of the electromagnetic clutch with one terminal of the sheet or record controlled switch 72. A branch wire 102 connects the other terminal of the switch 72 and the other terminals of the sheet or record controlled light switches 69 and 73 which are not connected with the wire 76, with the stationary contact 83 of the switch 81, and a wire 103 connects the switch arm 84 of the switch 81 with the wire 77, so that when the switch arm 84 contacts the stationary contact 83, the illumination of the lamps 12 is under the control of the sheet controlled switches 69 and 73 and the energization of the electromagnetic clutch 32—33 is under the control of the sheet controlled switch 72, and when the switch arm 84 is out of contact with the stationary contact 83, the switches 69, 72 and 73 cannot energize the illuminating lamps or electromagnetic clutch.

The arrangement is such that when the switches 81 and 85 are in their normal positions with the relay coil 79 deenergized and the switch arms 84 and 88 respectively contacting the contacts 83 and 87, the switches 69, 72 and 73 are connected with the wire 77 through the contact 83 and switch arm 84 for engaging the electromagnetic clutch 32—33 and energizing the illuminating lamps 12 under the control of the sheets or records fed by the record feeding means, and the motor field coil 94 is connected with the wire 77 through the contact 87 and switch arm 88 to effect rotation of the motor shaft 37 in the direction to drive the record feeding means drive shaft 24 through the transmission 38.

In these positions of the switch arms 84 and 88, as shown in Figure 8, the apparatus is in condition for photographing sheets or records, and assuming the main switch 78 to be closed, the motor 36 is rotating in the direction to drive the sheet or record feeding means through the transmission 38 and each sheet or record, as it is fed by the record feeding means toward the photographic field 6, engages the switch arm 68 and actuates it to close the light control switch 69 and thus energizes the illuminating lamps 12 while this switch is under the control of the fed sheet, the fed sheet closing the light control switch a short time before the sheet reaches the photographic field 6 so that the lamps 12 reach maximum brilliance before the sheet enters the photographic field.

As the fed sheet approaches closer to the photographic field after it has closed the switch 69 and immediately before it enters the photographic field, the fed sheet engages the switch arm 71 and actuates it to close the clutch and light control switches 72 and 73. Closure of the clutch control switch 72 engages the electromagnetic clutch 32—33 to drive the sensitized strip feeding means from the motor 36 for feeding the sensitized strip 11 in the camera 10 to photograph the sheet as it passes through the photographic field 6, and closure of the light control switch 73 maintains the illuminating lamps energized while the fed sheet is passing through the photographic field.

A normally open manually controlled space switch 104 has one terminal thereof connected with the wire 102 by a wire 105 and has the other terminal thereof connected with the wire 101 by a wire 106, so the electromagnetic clutch 32—33 may be engaged by manually closing this switch for driving the sensitized strip feeding means independently of the sheet controlled switch 72 for spacing groups of photographs of sheets or records on the sensitized strip.

An interval timer of usual construction is schematically shown at 107 in Figure 8, and comprises a pivotally mounted switch arm 108 yieldably urged to one end of its movement against a stop 109, a timer switch 111 yieldably urged into closed position and adapted to be opened by the switch arm 108 when this switch arm is moved to the other end of its movement, and an electric timer motor 112 including a motor coil 113 for operating the switch arm at a governed velocity, to said other end of its movement to open the timer switch when the timer motor coil is energized, the governed velocity of the switch arm as operated by the motor providing the timing interval of the timer and the switch arm 108 returning to the first mentioned end of its movement under its yieldable urge when the timing motor is deenergized preparatory to another timing cycle of the timer.

A wire 114 connects the wire 77 with one terminal of a manually controlled cycle switch 115 which is yieldably urged into open position, and a branch wire 116 connects the other terminal of the switch 115 with one terminal of the relay coil 79, with one terminal of the timer motor coil 113, and with the stationary contact 82 of the switch 81. A branch wire 117 connects the other terminals of the relay coil and the timer motor coil with one terminal of the timer switch 111, and a wire 118 connects the other terminal of the timer motor switch 111 with the lead wire 74.

The interval timer 107 serves, in cooperation with the switch 115 and the relay 79—81—85, for conveniently and with a minimum attention on the part of the operator, reversing the direction of rotation of the motor shaft 37 from the normal direction thereof and consequently driving the sensitized strip feeding means through the transmission 39, independently of the sheet controlled switch 72 and the electromagnetic clutch 32—33, to wind the usual leader and trailer portions of the sensitized strip 11 in the camera 10 from the feed reel 14 onto the take up reel 15 and then to again reverse the direction of rotation of the motor shaft to the normal direction thereof and consequently drive the record feeding means through the transmission 38 for photographing sheets. This requires only that the operator momentarily close the cycle switch 115.

Observing that the timer switch 111 and stationary contact 82 and its switch arm 84 are connected in series controlling relation with the timer motor coil 113 and relay coil 79 and that the cycle switch 115 is connected in controlling relation with the timer motor coil and relay coil, closure of the cycle switch energizes the relay coil 79 and timer motor coil 113, with the result that the timer motor 112 actuates the switch arm 108 at a governed velocity toward the timer switch 111 and that the relay coil moves the switch arms 84 and 88 respectively out of contact with the stationary contacts 83 and 87 respectively into contact with the stationary contacts 82 and 86.

Movement of the switch arm 84 out of contact with the stationary contact 83 opens the circuit of the sheet controlled switches 69, 72 and 73 so that illumination of the lamps 12 and the engagement of the electromagnetic clutch 32—33 is prevented, and movement of this switch arm into contact with the stationary contact 82 energizes the timer motor coil 113 and relay coil 79 in shunt with the cycle switch 115 so that as soon as the switch arm 84 contacts the stationary contact 82 the operator can release the cycle switch, and movement of the switch arm 88 out of contact with the stationary contact 87 and into contact with the stationary contact 86, reverses the direction of rotation of the motor shaft to drive the film feeding mechanism through the transmission 39 instead of driving the record feeding means through the transmission 38.

This condition is maintained during the timing interval of the timer 107, to fully wind the leader or trailer portion of the sensitized strip in the camera onto the take up reel 15, until the timer switch arm 108, driven at a governed velocity by the timer motor, opens the timer switch 111 and thus deenergizes the timer motor coil 113 and relay coil 79, whereupon the switch arm 108 returns under its yieldable urge to its normal position against the stop 109 and permits the timer switch 111 to again close, and the deenergization of the relay coil 79 permits the switch arms 84 and 88 to move respectively out of contact with the stationary contacts 82 and 86 and respectively into contact with the contacts 83 and 87 before the timer switch closes with the results that the deenergization of the timer motor coil and relay coil is continued, the control of the lamps 12 and the electromagnetic clutch 32—33 is restored to the sheet controlled switches 69, 72 and 73, and the direction of rotation of the motor shaft 37 is reversed to its normal direction for photographing sheets.

While I have thus described my invention, I do not wish to be limited to the precise details described, as changes may be readily made without departing from the spirit of my invention, but having thus described my invention, I claim as new and desire to secure by Letters Patent the following:

1. In a photographic copying apparatus, the combination of a camera provided with sensitized strip feeding means, record feeding means for feeding records through the photographic field of said camera, reversible drive means, means for selecting the direction of rotation of said drive means, a first transmission for driving said strip and record feeding means from and with rotation of said drive means in one direction and comprising an overrunning clutch, and a second transmission for driving said strip feeding means in the same direction as it is driven by said first transmission from and with rotation of said drive means in the direction opposite said first mentioned direction thereof and comprising an overrunning clutch.

2. In a photographic copying apparatus, the combination of a camera provided with sensitized strip feeding means, record feeding means for feeding records through the photographic field of said camera, reversible drive means, means for selecting the direction of rotation of said drive means, a first transmission for driving said strip and record feeding means from and with rotation of said drive means in one direction and comprising an overrunning clutch and a clutch under the control of records fed by said record feeding means and arranged in series with said overrunning clutch, and a second transmission for driving said strip feeding means in the same direction as it is driven by said first transmission from and with rotation of said driving means in the direction opposite said first mentioned direction thereof and comprising an overrunning clutch.

3. In a photographic copying apparatus, the combination of a camera provided with sensitized strip feeding means, record feeding means for feeding records through the photographic field of said camera, a reversible electric drive motor, a reversing switch connected with said motor for selecting the direction of rotation thereof, a first transmission for driving said strip and record feeding means from and with rotation of said motor in one direction and comprising an overrunning clutch, and a second transmission for driving said strip feeding means in the same direction as it is driven by said first transmission from and with rotation of said motor in the direction opposite said first mentioned direction thereof and comprising an overrunning clutch.

4. In a photographic copying apparatus, the combination of a camera provided with sensitized strip feeding means, record feeding means for feeding records through the photographic field of said camera, a reversible electric drive motor, a reversing switch connected with said motor for selecting the direction of rotation thereof, a first transmission for driving said strip and record feeding means from and with rotation of said motor in one direction and comprising an overrunning clutch and a clutch under the control of records fed by said record feeding means and arranged to drive said strip feeding means from said overrunning clutch, and a second transmission for driving said strip feeding means in the same direction as it is driven by said first transmission from and with rotation of said motor in the direction opposite said first mentioned direction thereof and comprising an overrunning clutch.

5. In a photographic copying apparatus, the the combination of a camera provided with sensitized strip feeding means, record feeding means for feeding records through the photographic field of said camera, alined strip and record feeding means drive shafts, a clutch associated with the adjacent ends of said drive shafts for driving said strip feeding means drive shaft from said record feeding means drive shaft and under the control of records fed by said record feeding means, reversible drive means comprising a main drive shaft arranged in parallelism with said strip and record feeding means drive shafts, means for selecting the direction of rotation of said main drive shaft, a first transmission for driving said record feeding means drive shaft from and with rotation of said main drive shaft in one direction and comprising an overrunning clutch, and a second transmission spaced along said main drive shaft from said first transmission for driving said strip feeding means drive shaft in the same direction as it is driven by said first transmission and record controlled clutch from and with rotation of said main drive shaft in the direction opposite said first mentioned direction thereof and comprising an overrunning clutch.

6. In a photographic copying apparatus, the combination of a camera provided with sensitized strip feeding means, record feeding means for feeding records through the photographic field of said camera, alined strip and record feeding means drive shafts, a clutch associated with the adjacent ends of said drive shafts for driving said strip feeding means drive shaft from said record feeding means drive shaft and under the control of records fed by said record feeding means, reversible drive means comprising a main drive shaft arranged in parallelism with said strip and record feeding means drive shafts, means for selecting the direction of rotation of said main drive shaft, a first transmission for driving said record feeding means drive shaft from and with rotation of said main drive shaft in one direction and comprising an overrunning clutch, and a second transmission spaced along said main drive shaft from said first transmission for driving said strip feeding means drive shaft in the same direction as it is driven by said first transmission and record controlled clutch from and with rotation of said main drive shaft in the direction opposite said first mentioned direction thereof and comprising two overrunning clutches respectively connected with said main and strip feeding drive shafts.

7. In a photographic copying apparatus, the combination of a camera provided with sensitized strip feeding means, record feeding means for feeding records through the photographic field of said camera, alined strip and record feeding means drive shafts, a clutch associated with the adjacent ends of said drive shafts for driving said strip feeding means drive shaft from said record feeding means drive shaft and under the control of records fed by said record feeding means, a reversible electric drive motor arranged with its shaft in parallelism with said strip and record feeding means drive shafts, a reversing switch connected with said motor for selecting the direction of rotation thereof, a first transmission at one end of said motor for driving said record feeding means drive shaft from and with rotation of said motor shaft in one direction and comprising an overrunning clutch, and a second transmission at the other end of said motor for driving said strip feeding means drive shaft in the same direction as it is driven by said first transmission and record controlled clutch from and with rotation of said motor shaft in the direction opposite said first mentioned direction thereof and comprising an overrunning clutch.

8. In a photographic copying apparatus, the combination of a camera provided with sensitized strip feeding means, record feeding means for feeding records through the photographic field of said camera, alined strip and record feeding means drive shafts, a clutch associated with the adjacent ends of said drive shafts for driving said strip feeding means drive shaft from said record feeding means drive shaft and under the control of records fed by said record feeding means, a reversible electric drive motor arranged with its shaft in parallelism with said strip and record feeding means drive shafts, a reversing switch connected with said motor for selecting the direction of rotation thereof, a speed reducing positive first transmission at one end of said motor for driving said record feeding means drive shaft from and with rotation of said motor shaft in one direction and comprising an overrunning clutch, and a high speed second transmission at the other end of said motor for driving said strip feeding means drive shaft in the same direction as it is driven by said first transmission and record controlled clutch from and with rotation of said motor shaft in the direction opposite said first mentioned direction thereof and comprising two pulleys respectively coaxial with said motor and strip feeding means drive shaft, a belt trained over said pulleys, and two overrunning clutches respectively between said motor shaft and the pulley coaxial therewith and between said strip feeding means drive shaft and the pulley coaxial therewith.

9. In a photographic copying apparatus, the combination of claim 1 and further comprising an interval timer, means under the control of said timer for maintaining said selecting means in position to effect rotation of said drive means in said second mentioned direction thereof during the timing interval of said timer and positioning said selecting means in position to terminate rotation of said drive means in said second mentioned direction thereof at the end of said timing interval, and means for placing said selecting means in said first mentioned position thereof and initiating the timing cycle of said timer.

10. In a photographic copying apparatus, the combination of claim 3 and further comprising an interval timer, means under the control of said timer for maintaining said reversing switch in position to effect rotation of said motor in said second mentioned direction thereof during the timing interval of said timer and positioning said reversing switch in position to effect rotation of said motor in said first mentioned direction thereof at the end of said timing interval, and means for placing said reversing switch in said first mentioned position thereof and initiating the timing cycle of said timer.

11. In a photographic copying apparatus, the combination of claim 1 and further comprising an interval timer, electromagnetic means controlling the positioning of said selecting means, a switch connected in controlling relation with said electromagnetic means and under the control of said timer for maintaining said selecting means in position to effect rotation of said drive means in said second mentioned direction thereof during the timing interval of said timer and for positioning said selecting means in position to terminate rotation of said drive means in said second mentioned direction of rotation thereof at the end of said timing interval, and means for placing said switch in position to effect rotation of said drive means in said second mentioned direction thereof and initiating the timing cycle of said timer.

12. In a photographic copying apparatus, the combination of claim 3 and further comprising an interval timer, an electromagnetic relay comprising a relay coil, said reversing switch and a second switch both under the control of said relay coil, said second switch being connected in controlling relation with said relay coil and under the control of said timer for maintaining said reversing switch in position to effect rotation of said motor in said second mentioned direction thereof during the timing interval of said timer and for positioning said reversing switch in position to effect rotation of said motor in said first mentioned direction thereof at the end of said timing interval, and means comprising a third switch connected in controlling relation with said relay coil for placing said reversing switch in position to effect rotation of said motor in said second mentioned direction thereof and initiating the timing cycle of said timer.

13. In a photographic copying apparatus, the combination of claim 3 and further comprising an interval timer comprising an electric timing mechanism motor and a timer switch connected in controlling relation with said timing mechanism motor and normally in motor energizing position and under the control of the timer mechanism to deenergize said timing mechanism motor at the end of the timing interval of said timer, an electromagnetic relay comprising a relay coil, said reversing switch and a third switch both under the control of said relay coil, said third and timer switches being connected in series controlling relation with said timing mechanism motor and relay coil for maintaining said timing mechanism motor energized and for maintaining said reversing switch in position to effect rotation of said drive motor in said second mentioned direction thereof during the timing interval of said timer and for deenergizing said timing mechanism motor and for positioning said reversing switch in position to effect rotation of said drive motor in said first mentioned direction thereof at the end of said timing interval, and a fourth switch connected in controlling relation with said timer motor and relay coil for placing said reversing switch in position to effect rotation of said drive motor in said second mentioned direction thereof and initiating the timing cycle of said timer.

14. In a photographic copying apparatus, the combination of claim 2 and further comprising an interval timer, means under the control of said timer for maintaining said selecting means in position to effect rotation of said drive means in said second mentioned direction thereof during the timing interval of said timer and positioning said selecting means in position to effect rotation of said drive means in said first mentioned direction thereof at the end of said timing interval, clutch disengaging means under the control of said timer for maintaining said second mentioned clutch disengaged during the timing interval of said timer and placing the same under the control of records fed by said record feeding means at the end of said timing interval, and means for placing said selecting means in said first mentioned position thereof and said clutch disengaging means in clutch disengaging position and initiating the timing cycle of said timer.

15. In a photographic copying apparatus, the combination of claim 4 and further comprising an interval timer, an electromagnetic relay comprising a relay coil, said reversing switch and a second switch both under the control of said relay coil, said second switch being connected in controlling relation with said relay coil and under the control of said timer for maintaining said reversing switch in position to effect rotation of said motor in said second mentioned direction thereof during the timing interval of said timer and positioning said reversing switch in position to effect rotation of said motor in said first mentioned direction thereof at the end of said timing interval, clutch disengaging means under the control of said relay coil for maintaining said second mentioned clutch disengaged during the timing interval of said timer and placing the same under the control of records fed by said record feeding means at the end of said timing interval, and means for placing said reversing switch in said first mentioned position thereof and said clutch disengaging means in clutch disengaging position and initiating the timing cycle of said timer.

16. In a photographic copying apparatus, the combination of claim 4 and further comprising said second mentioned clutch being electromagnetic, an interval timer comprising an electric timing mechanism motor and a timer switch connected in controlling relation with said timing mechanism motor and normally in motor energizing position and under the control of the timer mechanism to deenergize said timing mechanism motor at the end of the timing interval of said timer, an electromagnetic relay comprising a relay coil, said reversing switch and a double throw third switch both under the control of said relay coil, one stationary contact of said third switch and said timer switch being connected in series controlling relation with said timing mechanism motor and relay coil for maintaining said timing mechanism motor energized and for maintaining said reversing switch in position to effect rotation of said drive motor in said second mentioned direction thereof during the timing interval of said timer and for deenergizing said timing mechanism motor and for positioning said reversing switch in position to effect rotation of said drive motor in said first mentioned direction thereof at the end of said timing interval, the other stationary contact of said third switch being connected in controlling relation with said second mentioned clutch for maintaining the same disengaged during the timing interval of said timer and placing the same under the control of records fed by said record feeding means at the end of said timing interval, and a fourth switch connected in controlling relation with said timing mechanism motor and relay coil for placing said reversing switch in position to effect rotation of said drive motor in said second mentioned direction thereof and said third switch in timing mechanism motor energizing and clutch disengaging position and initiating the timing cycle of said timer.

ELMER L. JOHNSON.

No references cited.